(12) United States Patent
Perfetta et al.

(10) Patent No.: US 7,698,534 B2
(45) Date of Patent: Apr. 13, 2010

(54) REORDERING APPLICATION CODE TO IMPROVE PROCESSING PERFORMANCE

(75) Inventors: Rodolph Gérard Jacques Ascanio Jean-Denis Perfetta, Cambridge (GB); Graham Peter Wilkinson, Cambridge (GB)

(73) Assignee: ARM Limited, Cambridge (GB)

( * ) Notice: Subject to any disclaimer, the term of this patent is extended or adjusted under 35 U.S.C. 154(b) by 231 days.

(21) Appl. No.: 11/708,703

(22) Filed: Feb. 21, 2007

(65) Prior Publication Data

US 2008/0201698 A1 Aug. 21, 2008

(51) Int. Cl.
*G06F 9/52* (2006.01)

(52) U.S. Cl. ...................... 712/214; 712/219
(58) Field of Classification Search ................ 712/214; 717/148, 159
See application file for complete search history.

(56) References Cited

U.S. PATENT DOCUMENTS

| | | | | |
|---|---|---|---|---|
| 5,530,964 A * | 6/1996 | Alpert et al. | ................ | 717/158 |
| 5,966,537 A * | 10/1999 | Ravichandran | ............. | 717/158 |
| 6,026,485 A * | 2/2000 | O'Connor et al. | ........... | 712/226 |
| 6,139,199 A * | 10/2000 | Rodriguez | .................. | 717/159 |
| 6,487,716 B1 * | 11/2002 | Choi et al. | .................. | 717/159 |
| 6,751,791 B2 * | 6/2004 | Inaba | ......................... | 717/154 |
| 6,851,109 B1 * | 2/2005 | Alexander et al. | .......... | 717/148 |
| 7,313,790 B2 * | 12/2007 | Ju | ............................... | 717/159 |
| 7,424,705 B2 * | 9/2008 | Lewis et al. | ................. | 717/148 |
| 7,450,131 B2 * | 11/2008 | Swamy et al. | ............... | 345/565 |
| 7,451,438 B2 * | 11/2008 | Kielstra et al. | .............. | 717/154 |
| 2006/0026574 A1 * | 2/2006 | Lesot et al. | ................. | 717/140 |

OTHER PUBLICATIONS

Huang, X. et al., Fast and Efficient Partial Code Reordering: Taking Advantage of Dynamic Recompilation, 2006, ACM, pp. 184-192.*
Hennessy, J.L., etal., Code Generation and Reorganization in the Presence of Pipeline Constraints, 1982, ACM, 120-127.*

* cited by examiner

*Primary Examiner*—Eric Coleman
(74) *Attorney, Agent, or Firm*—Nixon & Vanderhye P.C.

(57) ABSTRACT

A method of reordering a sequence of code for processing by a target data processor in order to reduce an execution time for said code on said target data processor is disclosed. The method comprises the steps of: in response to a request to execute said sequence of code, loading said sequence of code into a volatile data store associated with said target data processor; analyzing said sequence of code in relation to properties of said target data processor; identifying interlocks within said sequence of code when executing on said target data processor, in which a portion of code would be stalled while waiting for an earlier portion to complete; reordering said sequence of code to remove at least some of said interlocks; and executing said reordered sequence of code; wherein said steps of analyzing, identifying, reordering and executing are performed by said target data processor.

14 Claims, 5 Drawing Sheets

REORDERING APPLICATION CODE TO IMPROVE PROCESSING PERFORMANCE

BACKGROUND OF THE INVENTION

1. Field of the Invention

The field of the invention relates to data processing and in particular to reordering application code to improve processing performance.

2. Description of the Prior Art

There is a desire in data processing to increase the speed of execution of applications. Applications are generally written by a programmer, in a high level language that is easy for a person to understand. A compiler then changes this to machine code which controls a processor to perform the actions specified in the high level language by the programmer. In addition to changing the language the compiler seeks to improve performance times of the application by rearranging the code. The compiler compiles the application from a high level language in which it was written to machine code native to a particular processor that is to process the application. The compiler generally also takes account of the properties of that processor and rearranges the code to improve the execution time on the processor. The compiled application in the form of machine code may then be stored in an apparatus comprising the processor that is to process it.

Although it is clearly efficient to rearrange the code when translating it from one language to another, there may be situations where it is not possible to rearrange it with respect to the properties of a particular processor. For example, when processors are updated, they are generally backwards compatible, i.e. compatible with earlier generation processors and thus, will be able to process the applications that these earlier generation processors could process. However, their hardware configuration will be different from these earlier generation processors and thus, the applications that were compiled to run efficiently on the earlier generation processors may not run as efficiently on the later ones. Although applications could be compiled again for the new processors, there may be situations where this is not appropriate, for example where the processors are within platforms that the designers of the processors do not control such as within mobile phones. Thus, it would be desirable to be able to improve the performance of such applications without needing to recompile them.

Machine independent programming code is also known. For example java bytecode, which can be executed by any processing system using a software virtual machine running on that system. While a java virtual machine causes a processor to execute the java bytecodes the order of this bytecode is set by the java compiler and as the java compiler is generic and not machine specific, the bytecode order produced may well be sub-optimal for a particular machine.

Some hardware systems such as the ARM® 926 ejs processor can execute much of the machine independent code as native code. In such cases there is no need to compile the code, but once again the order of the code may be sub-optimal for the processor that is to process it.

It would be desirable to improve the performance of machine independent code relative to a particular machine.

SUMMARY OF THE INVENTION

A first aspect of the present invention provides a method of reordering a sequence of code for processing by a target data processor in order to reduce an execution time for said code on said target data processor comprising the steps of: in response to a request to execute said sequence of code, loading said sequence of code into a volatile data store associated with said target data processor; analyzing said sequence of code in relation to properties of said target data processor; identifying interlocks within said sequence of code when executing on said target data processor, in which a portion of code would be stalled while waiting for an earlier portion to complete; reordering said sequence of code to remove at least some of said interlocks; and executing said reordered sequence of code; wherein said steps of analyzing, identifying, reordering and executing are performed by said target data processor.

The present invention recognises the problem of code that is to be processed by a target processor not being optimized for that processor. This may be due to a number of things such as the code having been complied with respect to a similar earlier generation processor, or the fact that the code is platform independent code that has been compiled by a generic compiler. It recognises that interlocks in particular, that arise due to the latency within a processor are very processor dependent. For example, the time taken to store data will vary between different processors. In a processor where it takes three cycles to store data, any later action requiring that data cannot be executed until three cycles later and it therefore would improve the performance of that sequence of code and reduce circumstances where the processor is made to stall, if the sequence of code were arranged such that any process requiring the stored data did not occur in the sequence until at least three cycles later.

The present invention addresses the problem of processor dependent interlocks arising in code not compiled for a specific processor, by providing a method of analysing, and reordering a sequence of code once it has been loaded ready to execute. Thus, rather than compiling the code for a particular processor, a method is provided in which the code that is to be processed can itself be rearranged at run time or just before run time, in a way that takes account of the processor that is to process it and improves its performance with respect to that particular processor. Thus, the provision of such a method specific to a particular processor allows the processor to efficiently process both machine independent code and code that has been compiled with respect to a different processor.

It should be noted that although the method of the present invention may have similarities with compilation, it differs in that it is performed at run time, once the code has been loaded for execution and it acts to rearrange the code that is to be executed rather than changing the language of the code as well as rearranging it. The code that is rearranged is code that is to be processed by the processor and may be machine code native to that processor or it may be platform independent code that the processor is adapted to execute.

In some embodiments, said code comprises machine independent code.

Although, embodiments of the invention are adapted to rearrange different sorts of code, it is particularly efficient at analyzing and reordering machine independent code. This is because not only has this code generally not been complied with the specific processor in mind and as such will benefit from being rearranged, it is also code that is relatively easy to analyze as it is a relatively high level language.

Embodiments of the invention are particularly applicable to Java bytecode.

In some embodiments, said target data processor is adapted to execute at least some of said java bytecode as native code.

Data processors that have been adapted to execute at least some of the Java bytecode as native code benefit particularly well from this method. The Java bytecode is not complied and thus, it is particularly easy to analyse, but has not been written with the target processor in mind and thus, may well contain a number of interlocks that performance of the code would be improved by removing.

In other embodiments, said code comprises code native to said target data processor.

In some circumstances, for example where the code had been complied for a data processor different to the target data processor, then an alternative solution to recompiling it for the new data processor would be to perform the method according to an embodiment of the present invention and remove any interlocks by analyzing the native code once it has been loaded for execution.

In some embodiments, said steps of analyzing, identifying and reordering are performed by said target data processor at a same time as and interleaved with an initial processing of said sequence of code.

Embodiments of the present invention can be performed at the same time as initial processing of the sequence of code. If the sequence of code is to be processed a number of times, then it may be advantageous to commence its processing at the same time as analyzing the code for interlocks. Thus, as it processes the code, information regarding the interlocks are derived and an improved ordering of the sequence of code is achieved, later versions of the code being executed with the improved ordering. Thus, the performance of that sequence of code is improved at run time, without overly affecting the time to load the application.

In other embodiments of the present invention, said steps of analyzing, identifying and reordering are performed by said target data processor prior to executing said reordered sequence of code.

In other embodiments, it may be desirable to analyse identify and reorder the code immediately prior to executing any of the sequence of code. In such a case following loading of the sequence of code ready for execution it may be analysed and then the reordered code is executed rather than the original sequence. This has an effect on the load time of the application but will improve its performance.

In some embodiments, the method comprises a further step of overwriting said sequence of code with said reordered sequence of code.

Although, in many embodiments, this improved order of code is identified and produced each time the code is loaded for execution, in some embodiments it may be that once the improved reordering has been determined for a particular processor then the original sequence of code is overwritten and it is the reordered sequence of code which is then loaded at a subsequent loading of the sequence of code for execution. Although this may seem an efficient thing to do, it may not always be appropriate as the apparatus in which the sequence of code is run may not allow the overwriting of the original code for security reasons.

In some embodiments, said step of identifying interlocks, is further operable to identify further instances where rearrangement of said code could improve performance and said step of reordering comprises reordering to improve said performance.

Although, embodiments of the present invention are particularly applicable to identifying interlocks and removing them or at least some of them from the code by rearranging the code, embodiments of the invention can identify further inefficiencies relating to code order, and can improve performance by reordering to remove them as well as interlocks. These inefficiencies may for example relate to cache efficiency or to branch prediction efficiency.

A further aspect of the present invention provides a computer program product for reordering a sequence of code to run on a target data processor to improve an execution time of said sequence of code on said target data processor, said computer program product being adapted when processed by said target data processor to control said target data processor to perform the steps of the method according to a first aspect of the present invention.

In some embodiments, said sequence of code is formed from machine independent code, said computer program product further comprising control code for controlling processing of said machine independent code on said target data processor.

As discussed earlier, embodiments of the invention are particularly applicable to machine independent code. In such a case, control code is required for controlling processing of the machine independent code on the target processor. Embodiments of the invention provide the program for improving the performance by removing interlocks along with the program for controlling execution of the machine independent code.

In some embodiments, said machine independent code comprises java bytecode and said control code comprises java virtual machine code.

For example, the control code could be a Java virtual machine and the computer program product of embodiments of the present invention would comprise this Java virtual machine code along with code for analyzing and reordering the Java bytecode that is to be executed by the Java virtual machine. This is an efficient way to provide the program, as the Java virtual machine is software that is used for the processor to execute Java bytecode and thus, including code to increase the efficiency of the Java bytecode within the Java virtual machine enables the Java bytecode to be optimized or at least improved and controlled for execution in a coordinated way.

A yet further aspect of the present invention provides a data processing apparatus comprising: a data processor; a first data store for storing application code to be processed by said data processor and for storing optimizing code for reordering said application code to improve an execution time of said application code being executed by said data processor; and a volatile data store for storing said application code prior to said application code being processed by said data processor and for storing said optimizing code; said data processing apparatus being adapted in response to processing said optimizing code, to identify interlocks that would be produced by said application code when executing on said data processor, in which a portion of said application code would be stalled while waiting for an earlier portion to complete; and to reorder said application code to remove at least some of said interlocks.

In some embodiments, said data processing apparatus is further adapted to store said reordered application code within said volatile data store prior to processing said application code and to process said reordered application code on said data processor in place of processing said application code.

The data processing apparatus loads the sequence of code for execution and reorders it. The reordered application code can then be stored in the volatile data store to which the original sequence of code was loaded prior to execution.

In some embodiments, said application code is machine independent code and said first data store is adapted to further store control code for controlling processing of said machine independent code on said data processor, said optimizing code and said control code being stored as a single application.

As discussed previously, where machine independent code is processed and requires control code then the optimizing code of an embodiment of the present invention can be stored along with that control code forming a single application.

It should be noted that although it is termed optimizing code it will be clear to the skilled person that the code is there to improve performance of the sequence code by reordering it. The sequence of code may well not be "optimized" as although this is a desirable outcome the method of analyzing identifier and rearranging may not and in many cases will not be perfect.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
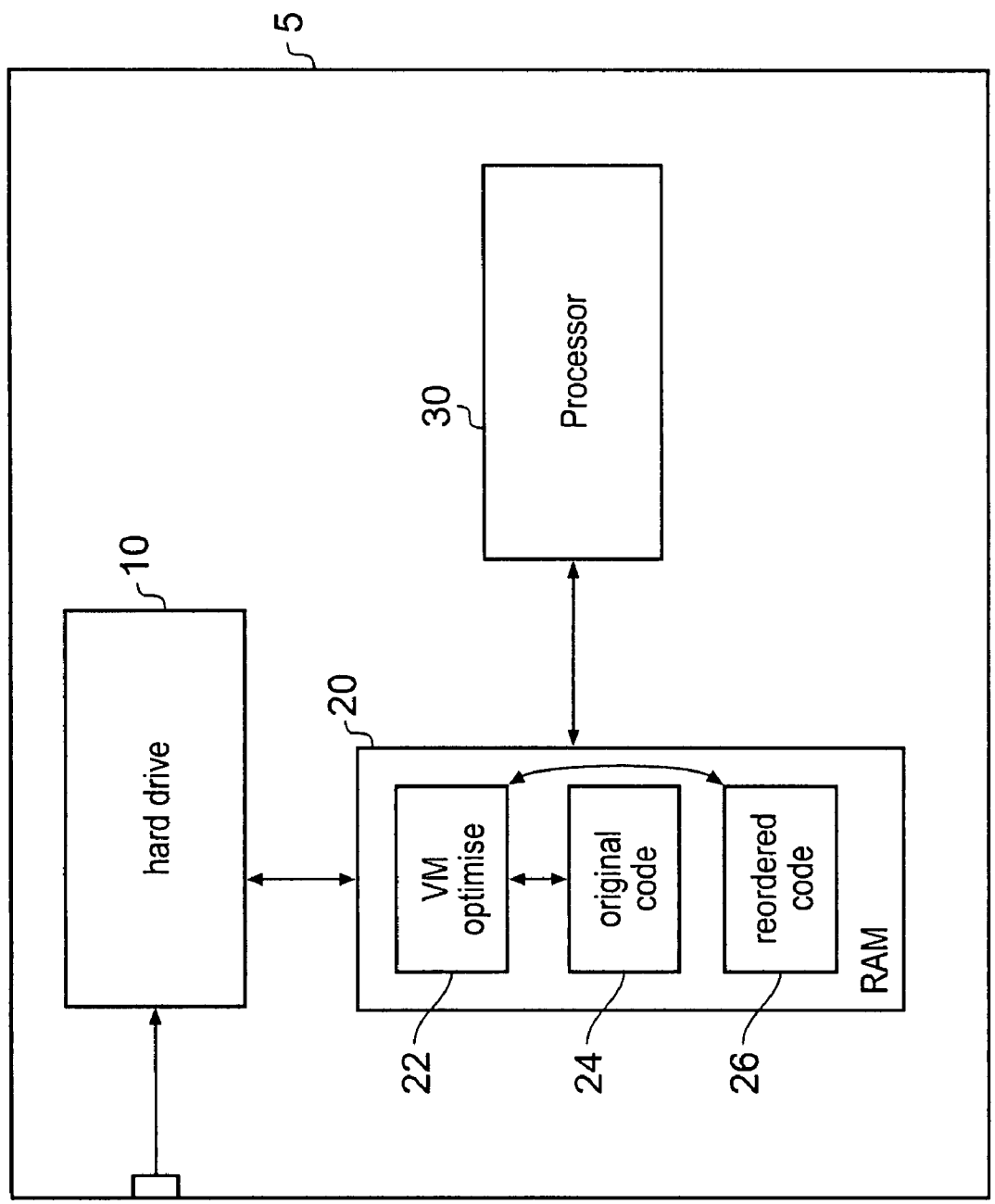
FIG. 1 illustrates a data processing apparatus according to an embodiment of the present invention.

FIG. 1 schematically shows a data processing apparatus 5 according to an embodiment of the present invention. The data processing apparatus comprises a hard drive 10 which stores applications that the processor 30 is to run. It will be appreciated that although in this embodiment, the non-volatile memory for storing the applications and virtual machine code is a hard drive, in other embodiments it could be some other non-volatile memory such as a flash memory.

In this embodiment, the hard drive 10 stores a software virtual machine as well as applications to be processed by the processor, the software virtual machine being for controlling the processor to run any applications which are in Java bytecode. The virtual machine additionally comprises an optimizing routine according to an embodiment of the present invention. This optimizing routine is within the virtual machine and seeks to analyze the Java bytecode that is to be processed by the processor to identify any interlocks that would occur when executing the Java bytecode on processor 30 and to remove at least some of these by reordering the sequence of java bytecode. Although it is referred to as an optimizing routine, it should be clear that this is its desired result and that in reality it may simply improve performance rather than optimize it.

Data processing apparatus 5 further comprises a volatile memory in this case a RAM 20. When an application is to be executed by processor 30 the virtual machine with the optimizing routine is loaded into RAM 20 from hard drive 10. The virtual machine 22 containing the optimizing code is loaded into RAM 20 and stored there along with the application code 24. The virtual machine 22 controls the execution of the original code within processor 30. As it processes it, the optimizing routine is also executed by processor 30 and the code of the application is analyzed and interlocks are identified. A preferred reordered version of the code 26 is then stored in RAM 20 and when the application is executed a subsequent time then it is this reordered code that is executed within processor 30. Thus, the performance of the processor executing the application can be improved.

It should be appreciated that in the embodiment described the optimizing routine is initially executed at the same time as the application. This is performed by the processor performing some steps of one routine and then some steps of the other routine as is well known in the art. In other embodiments the optimizing routine may be performed immediately before the application is run and it is then the reordered application code that is executed. This latter method has the disadvantage of increasing loading times for the code but the advantage of only running the improved reordered code.

The data processing apparatus 5 of FIG. 1 is shown very schematically. It would be clear to a skilled person that in reality it would have many more components and may for example be a mobile phone. In embodiments such as mobile phones, the processor is designed and built by a different entity to that which builds and designs much of the rest of the mobile phone. For this reason, the applications that are to be run on the processor may not be controlled by the person that designed the processor. Thus, the use of optimisation code to optimise applications that have not been designed specifically with that processor in mind can be very useful.

Figure 2:
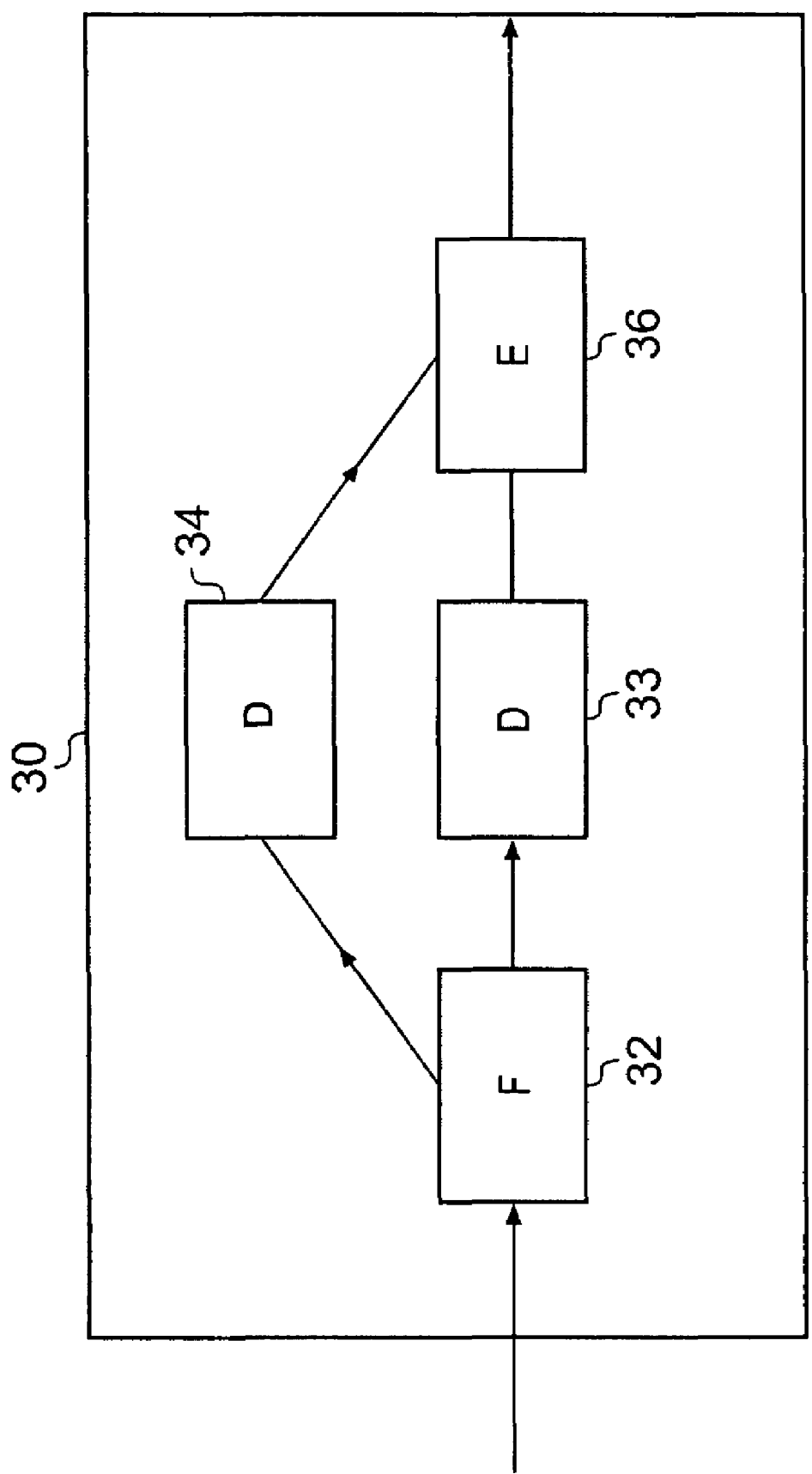
FIG. 2 shows a processor core of the data processing apparatus of FIG. 1.

FIG. 2 shows processor 30 in more detail. Processor 30 has a fetch stage 32 for fetching code from RAM 20. It has two decode stages 33 and 34 and an execution stage 36. Decode stage 33 is for decoding code native to processor 30 whereas decode stage 34 is for decoding Java bytecodes that cannot be decoded as native code. It should be noted, that although in this embodiment, the processor is able to process much Java bytecode as native code, it is not able to process all Java bytecode as native code and thus, some of the Java bytecode needs to pass via decoder 34 prior to being executed by execution unit 36.

Figure 3:
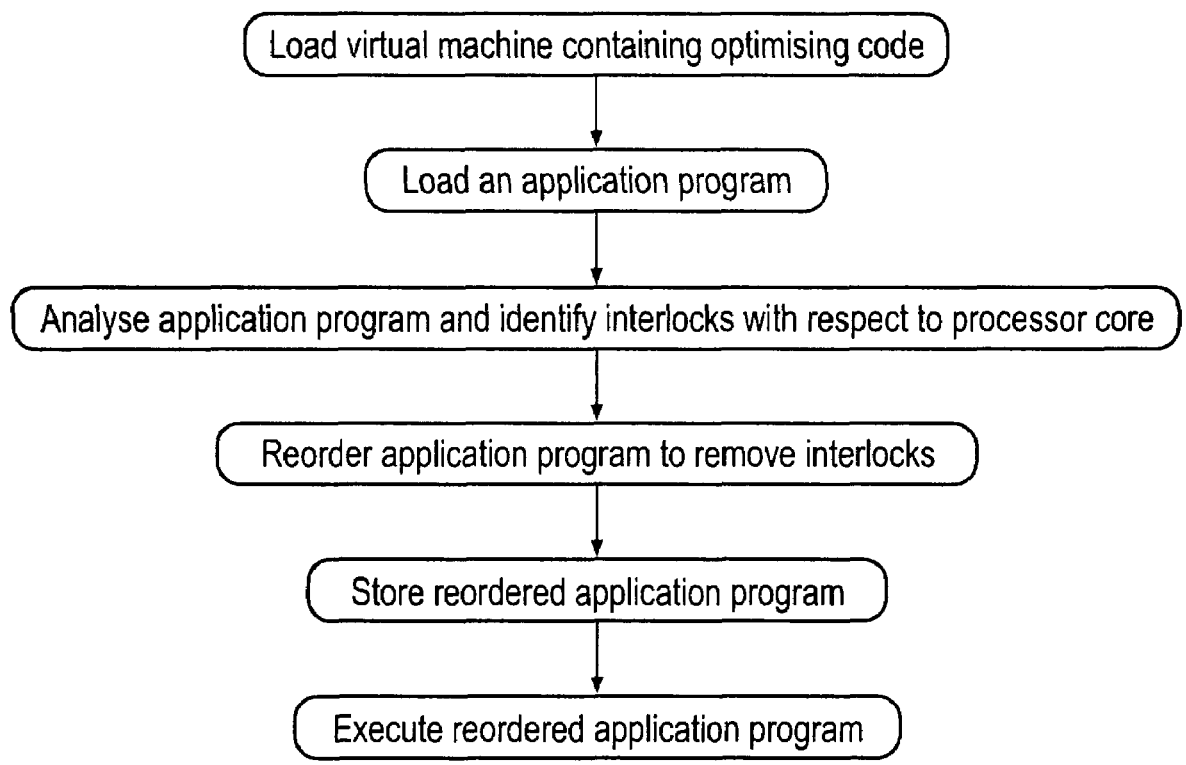
FIG. 3 shows a flow diagram illustrating the steps in a method according to one embodiment of the present invention.

FIG. 3 shows a flow diagram illustrating a method according to an embodiment of the present invention. Initially a virtual machine which contains the optimizing routine is loaded. This involves, loading the virtual machine software from the non-volatile storage such as hard drive 10 (of FIG. 1) into the memory used by the processor. Then, the application program that is to be processed by the processor is loaded under control of the virtual machine.

This application program is then analyzed for interlocks with respect to the processor core. This is done by executing the optimizing routine on the processor core. Interlocks are identified and the application program is reordered to remove them. The reordered application program is then stored in the memory used by the processor. This reordered application program can then be executed by the processor under control of the virtual machine.

It should be noted that the steps of analyzing the application program for interlocks and reordering the application program can be done by having a suitable collection of rules for that particular processor core that are within the optimizing code and are processed to remove the interlocks.

Figure 4:
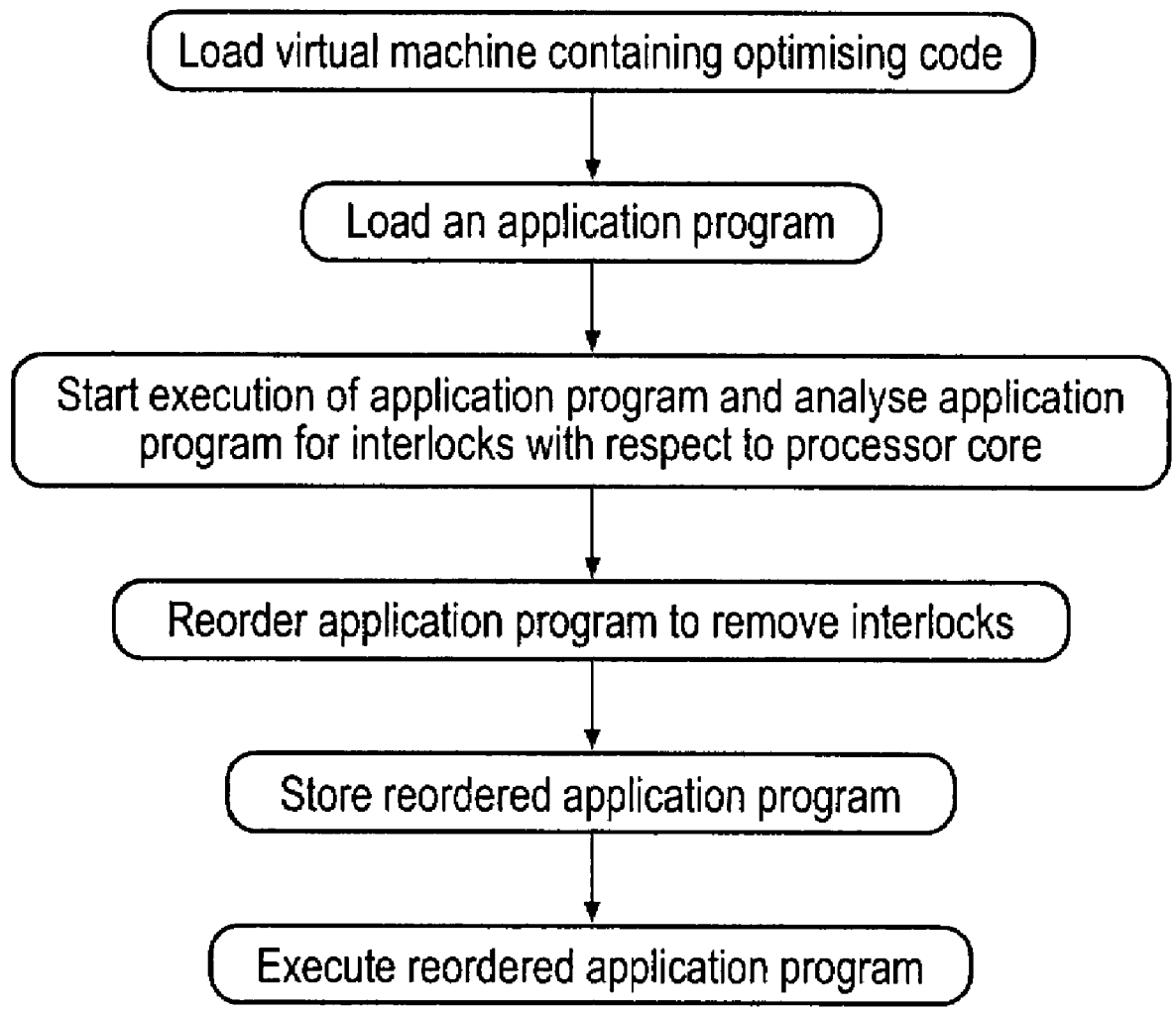
FIG. 4 shows a flow diagram illustrating the steps in a method according to a further embodiment of the present invention.

FIG. 4 shows an alternative embodiment of the present invention. In this embodiment the virtual machine containing the optimizing code is once again loaded into memory accessible by the processor. Then the application program is loaded under control of the virtual machine. In this particular embodiment, execution of the application program under control of the virtual machine starts immediately. This reduces the initial loading time for the application program compared to the embodiment of FIG. 3.

At the same time as the application program is executed, the application program is analysed for interlocks with respect to that particular processor core. This is done by executing the optimising code within the processor that is executing the application program. Generally these steps are interleaved with each other under control of the virtual machine. The application program can then be reordered following analysis of it to remove any interlocks and the reordered application program is then stored within the memory of the processor. The reordered application program can then be executed rather than the original application program.

In some embodiments, a further step of overwriting the original application program with the reordered program in the non-volatile storage of the data processing apparatus can also be performed. If this is done, then in future executions of the application program the optimisation steps would not need to be performed. However, generally the non volatile storage of a data processing apparatus is protected and it is not allowed to overwrite application programs stored therein.

Figure 5:
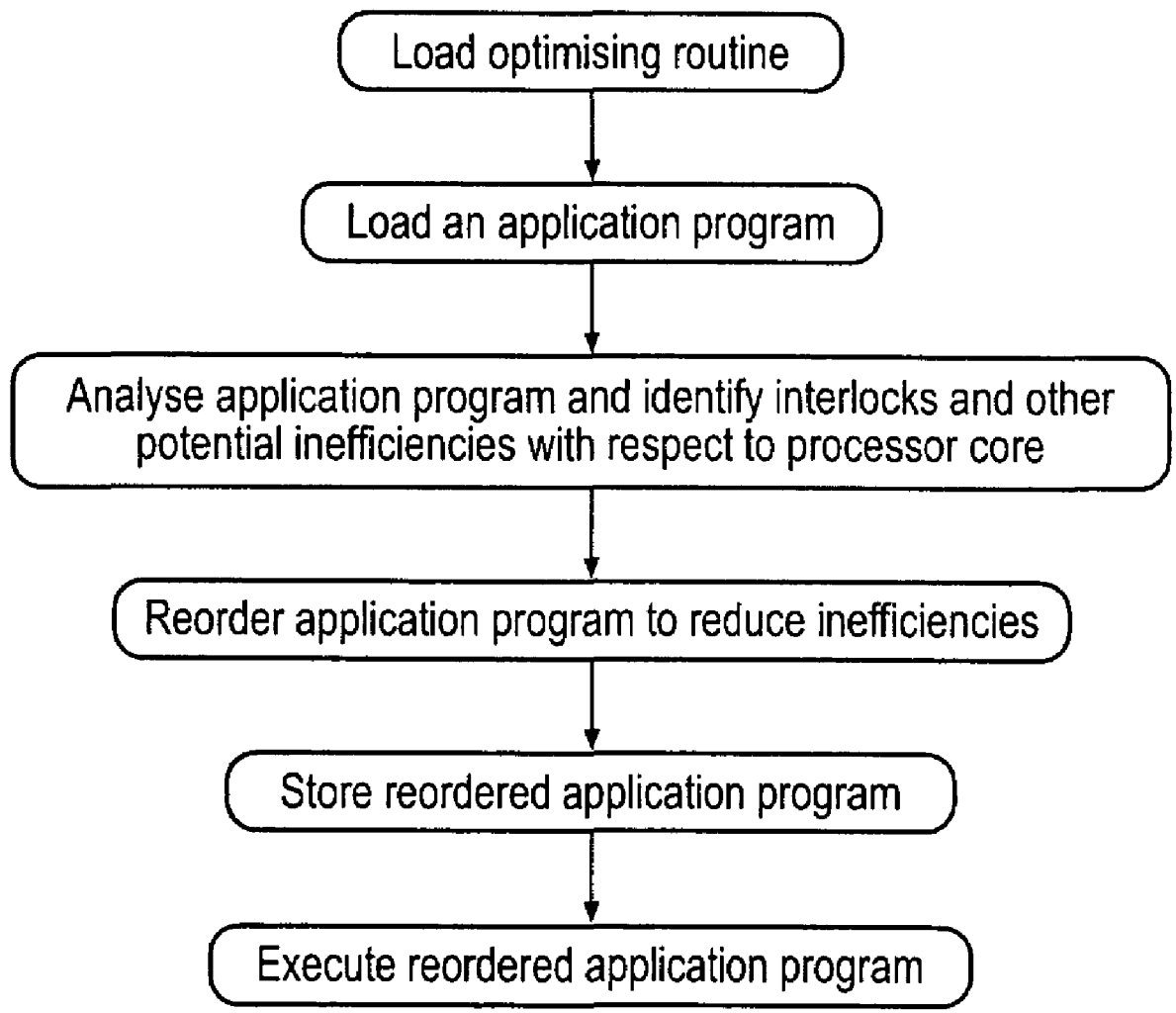
FIG. 5 shows a flow diagram illustrating steps in a method for improving performance of an application compiled for an earlier generation processor.

FIG. 5 shows a method according to a further embodiment of the present invention. In this method the application code that is to be executed is native code to the processor, but code that has been produced by compiling the application for an earlier generation processor. Initially the optimizing routine and the application code are loaded into memory used by the processor. Then, the optimizing routine is executed and it analyses the application program for interlocks and other inefficiencies with respect to the processor core. Interlocks and other inefficiencies in the application are identified and the application program is reordered to remove them. The reordered application program is then stored in the memory used by the processor. This reordered application program can then be executed by the processor.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of reordering a sequence of code for processing by a target data processor in order to reduce an execution time for said code on said target data processor comprising the steps of:
    loading said sequence of code, in response to a request to execute said sequence of code, into a volatile data store associated with said target data processor;
    analyzing said sequence of code in relation to properties of said target data processor;
    identifying, during said analysis, interlocks within said sequence of code when executing on said target data processor, in which a portion of code would be stalled while waiting for an earlier portion to complete;
    reordering, in response to said identified interlocks, said sequence of code to remove at least some of said interlocks; and
    executing said reordered sequence of code, wherein said steps of analyzing, identifying, reordering and executing are performed by said target data processor at a same time as and interleaved with an initial processing of said sequence of code.

2. A method according to claim 1, wherein said code comprises machine independent code.

3. A method according to claim 2, wherein said code comprises Java bytecode.

4. A method according to claim 3, wherein said target data processor is adapted to execute at least some of said java bytecode as native code.

5. A method according to claim 1, wherein said code comprises code native to said target data processor.

6. A method according to claim 2, wherein said steps of analyzing, identifying and reordering are performed by said target data processor prior to executing said reordered sequence of code.

7. A method according to claim 1, said method comprising a further step of overwriting said sequence of code with said reordered sequence of code.

8. A method according to claim 1, wherein said step of identifying interlocks includes the step of identifying further instances where rearrangement of said code could improve performance and said step of reordering comprises reordering to improve said performance.

9. A computer program product embodied in a computer readable storage medium, said product for reordering a sequence of code to be run on a target data processor to improve an execution time of said sequence of code on said target data processor, said computer program product, when processed by said target data processor, configured to control said target data processor to perform the steps of the method according to claim 1.

10. A computer program product according to claim 9, said sequence of code being formed from machine independent code, said computer program product further comprising control code for controlling processing of said machine independent code on said target data processor.

11. A computer program product according to claim 10, wherein said machine independent code comprises java bytecode and said control code comprises java virtual machine code.

12. A data processing apparatus comprising:
    a data processor;
    a first data store for storing application code to be processed by said data processor and for storing optimizing code for reordering said application code to improve an execution time of said application code being executed by said data processor; and
    a volatile data store for storing said application code prior to said application code being processed by said data processor and for storing said optimizing code;
    said data processing apparatus, in response to processing said optimizing code, configured to identify interlocks that would be produced by said application code when executing on said data processor, in which a portion of said application code would be stalled while waiting for an earlier portion to complete, and to reorder said application code to remove at least some of said interlocks at a same time as and interleaved with an initial processing of said sequence of code.

13. A data processing apparatus according to claim 12, wherein said data processing apparatus is configured to store said reordered application code within said volatile data store prior to processing said application code and to process said reordered application code on said data processor in place of processing said application code.

14. A data processing apparatus according to claim 12, wherein said application code is machine independent code and said first data store is configured to further store control code for controlling processing of said machine independent code on said data processor, said optimizing code and said control code being stored as a single application.

* * * * *